(12) United States Patent
Dieckmann et al.

(10) Patent No.: US 9,708,015 B2
(45) Date of Patent: Jul. 18, 2017

(54) REAR SPOILER DEVICE FOR A VEHICLE

(71) Applicant: WABCO GmbH, Hannover (DE)

(72) Inventors: Thomas Dieckmann, Pattensen (DE);
David Inkermann, Braunschweig (DE);
Timo Richter, Braunschweig (DE);
Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/782,436

(22) PCT Filed: Feb. 27, 2014

(86) PCT No.: PCT/EP2014/000519
§ 371 (c)(1),
(2) Date: Oct. 5, 2015

(87) PCT Pub. No.: WO2014/166568
PCT Pub. Date: Oct. 16, 2014

(65) Prior Publication Data
US 2016/0068200 A1 Mar. 10, 2016

(30) Foreign Application Priority Data

Apr. 13, 2013 (DE) .................. 10 2013 006 376

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC .................. B62D 35/001; B62D 35/007
See application file for complete search history.

(56) References Cited

U.S. PATENT DOCUMENTS

| | | | |
|---|---|---|---|
| 6,485,087 B1 | 11/2002 | Roberge et al. |
| 2004/0119319 A1 | 6/2004 | Reiman et al. |

FOREIGN PATENT DOCUMENTS

| | | |
|---|---|---|
| DE | 102 28 658 A1 | 1/2004 |
| DE | 10 2008 036 888 A1 | 2/2010 |
| DE | 20 2009 015 009 U1 | 2/2010 |
| DE | 20 2009 014 476 U1 | 3/2010 |
| DE | 20 2009 014 510 U1 | 3/2010 |
| DE | 10 2011 122 305 A1 | 6/2012 |
| DE | 10 2012 015 774 | 1/2013 |
| DE | 10 2012 011 082 A1 | 12/2013 |
| WO | WO 2008/024386 A2 | 2/2008 |
| WO | WO 2013/178366 A1 | 12/2013 |

*Primary Examiner* — Glenn Dayoan
*Assistant Examiner* — Melissa A Black
(74) *Attorney, Agent, or Firm* — Warner Norcross & Judd LLP

(57) ABSTRACT

A rear spoiler device for a vehicle with at least one rear door includes at least one lateral air-deflector element and a roof air-deflector element that can be adjusted between a default position and a travel position for contour extension and aerodynamic air conduction when the rear door is closed. The device comprises a wing, which has a first swivel joint to enable pivotable fastening to the rear door. The wing is adjustably attached to the lateral air-deflector element via at least one second swivel joint. At least one locking device is provided for locking the lateral air-deflector element with the wing. A coupling device is provided for coupling an adjustment of the locking device to the adjustment of the roof air-deflector element.

18 Claims, 10 Drawing Sheets

REAR SPOILER DEVICE FOR A VEHICLE

FIELD OF THE INVENTION

The present invention generally relates to rear spoiler devices for vehicles, e.g., utility vehicles.

BACKGROUND OF THE INVENTION

Rear spoilers serve to improve vehicle aerodynamics and can, accordingly, re-duce fuel consumption. They are fitted in the rear region of the vehicle and generally have air direction elements, which extend along the contours of the vehicle toward the rear, that is, with curved faces. Such rear spoilers can be secured to the roof or to the side walls.

DE 20 2009 014 476 U1, DE 20 2009 014 510 U1 and DE 20 2009 015 009 U1 describe rear spoiler embodiments in which the air direction elements or spoiler elements are displaceably or pivotably arranged in order to enable unimpeded opening of the door.

Pivotable or foldable rear spoilers are generally connected to the hinge of the rear door. DE 102 28 658 A1 describes different folding solutions in which planar faces, which can be pivoted by means of a hinge, are intended to enable an aerodynamic optimization in the travel region.

DE 10 2008 036 888 A1 describes embodiments of rear spoilers and connections to the vehicle, in which there is, inter alia, provision for there to be fitted between the rear door and the air direction element a carrier, which can be suspended for a substantially outwardly pivoted position of the door. When the rear flap is pivoted outward about the vertical pivot axis thereof, the air direction element is consequently first pivoted therewith until it reaches the outer faces of the side wall. When the rear flap is subsequently pivoted outward, the flexible carrier element is accordingly resiliently deformed.

Such connections of the air direction elements in the hinge region generally enable an adjustment of the air direction element between the rear door and the side wall when the rear door—as often provided in utility vehicles—is pivoted outward through 270° in order to secure it, for example, to the side wall.

Such systems are, however, generally very complex. They have, inter alia, complex articulation or hinge configurations. Furthermore, some rear spoiler systems only enable the use of relatively short air direction elements, whereby the improvement of the aerodynamics is limited.

Furthermore, the structural space in the hinge region of the rear door when the rear door is pivoted upward is very tight so that more complex rear spoiler configurations may impair the upward pivoting operation through 270°.

SUMMARY OF THE INVENTION

Generally speaking, it is an object of the present invention to provide a rear spoiler device that can be constructed with relatively little complexity and that enables reliable adjustment between the travel position and the basic, initial position.

According to an embodiment of the present invention, the rear spoiler device has at least one side spoiler, a roof spoiler, a locking device for locking the side spoiler and a coupling device for coupling the locking action to the adjustment action of the roof spoiler.

In the conventional construction of a vehicle rear having two rear doors, which in each case swing open laterally, the rear spoiler device preferably has two lateral air direction elements and two roof air direction elements, which are each intended to be fitted to one of the rear doors, respectively.

The link can be fitted to the rear door via a first pivot joint, in particular a vertical first rotation axle with a plurality of pivot joints. The lateral air direction element is preferably articulated to the link by a second rotation axle. Advantageously, a plurality of first pivot joints and a plurality of second pivot joints are each constructed so as to be vertically spaced apart from each other.

In the travel position, locking is effected via the locking device, which is received on the link so as to be able to be adjusted, for example, pivoted, and which is locked at one side to the lateral air direction element and at the other side to the rear door or the vehicle structure. To this end, the locking device engages with catch hooks for releasable engagement in catch receiving members at the front end of the lateral air direction element and in catch receiving members on the rear door or the vehicle structure. By this engagement or locking being carried out from above, stabilization is enabled by the inherent gravitational force, in particular with a self-centering receiving member.

The actuation of the locking device can be carried out manually. It may be carried out, for example, by a pivotable actuation lever, which adjusts, for example, pivots the locking device.

The roof spoiler preferably folds downward into the basic position thereof and is raised in an upward direction via the coupling device. This adjustment is coupled to the securing of the lateral air direction element via the coupling device.

The coupling device may be constructed such that, by a single actuation movement of the user, both the securing of the locking device for locking the lateral spoiler and the adjustment of the roof spoiler are carried out. In this instance, for example, it is also possible to use the actuation movement continuously for the adjustment of the roof spoiler and only over a partial path for the adjustment and securing of the locking device.

The reverse adjustment, that is, the release of the securing of the lateral spoiler and the reverse adjustment of the roof spoiler, can also be carried out in a manner coupled by the same actuation device.

Consequently, an arrangement is provided that can be locked and that can be pivoted and adjusted after unlocking. The lateral air direction element may be in abutment or in alignment with the front edge thereof, in particular in a flush manner, with the corresponding lateral wall of the vehicle. In contrast to conventional connections of the lateral air direction element to the hinge, however, the lateral air direction element can preferably be locked at the front end region thereof to the link and can be articulated in a rear region to the link in order, after unlocking, to be able to be pivoted about the link and with the link to the center of the rear door.

Some advantages are already thereby afforded. The otherwise tight structural space in the hinge region of the rear door is preferably not occupied or not occupied to the relevant extent; the lateral side air direction element can, after the unlocking, be pivoted inward about the link toward the center so that the entire rear door can subsequently be pivoted outward, for example, through approximately 270° and, for example, placed on or secured to the side wall. The side spoiler together with the lateral air direction element and link is consequently received between the rear door and the side wall, without having a disruptive effect in the hinge region. The overall length of the link and lateral air direction element may, for example, be selected such that the side spoiler, which is completely folded down in the basic position, extends substantially to the door edge (center of the vehicle rear); consequently, the securing of the rear door to the side wall is not disrupted by the side spoiler.

The first pivot joint of the link is advantageously fitted to the rear door with sufficient spacing from the hinge, for example, with about 10 cm or more spacing from the hinge of the rear door. For the securing, it is, for example, possible to drill holes in the rear door that are then closed again via the first pivot joints.

In the travel position with the rear door closed, a stable triangle is provided whose sides are formed by the link, the lateral air direction element and the vehicle and whose corners are formed by the at least one first pivot joint, the second pivot joint and the locking device.

Construction of such a triangle is stable, even when two of the corners are constructed using pivot joints or pivot bearings.

According to an embodiment of the present invention, a construction is provided that also prevents or minimizes fluttering or flexible vibration of the lateral air direction element during travel, since the lateral air direction element is secured at the front end region thereof and is retained in a region located further to the rear by the link. Consequently, the material of the lateral air direction element may be selected to be freer, for example, also thinner than in conventional constructions with an air direction element connected only at the front.

A side spoiler according to an embodiment of the present invention enables fitting to different door variants and door systems. In particular, the precise construction of the hinge of the rear doors, which may be very different with different producers and vehicle types, is not relevant. Only securing members of the first pivot bearing to the rear door, for example, by drilling holes, and a catch receiving member for the locking devices on the rear door or the vehicle structure are provided.

Advantageously, the entire rear spoiler device is secured exclusively to the rear door or the door leaf of the rear door. In this instance, the roof spoiler preferably has a securing device for securing to the rear door, with respect to which the roof air direction element can be pivoted. The securing device may, for example, be placed primarily or even exclusively from the top into the rear door or the door leaf of the rear door.

It should be appreciated that, with the inventive embodiments, securing of the roof spoiler to the vehicle structure or the vehicle roof is advantageously not required; securing to the rear door is sufficient. Consequently, securing can be effected in a rapid manner and independently of the roof types or the construction of the roof structure. By the roof spoiler preferably being secured even only to the upper edge of the rear door, for example, by vertical suspension, a rapid fitting operation is possible, without the outer face of the rear doors being occupied.

As a result of the locking of the locking device being coupled to the adjustment of the roof air direction element, synergistic effects are produced since, when the side spoiler is unlocked, the roof spoiler is already retracted (pivoted downward) and consequently a placement of the link and the lateral air direction element is subsequently enabled, wherein the link may also be constructed so as to be vertically shorter where applicable so that it is placed only on the rear door and does not extend in a vertical direction as far as the roof air direction element.

Consequently, simple handling and adjustment can be achieved by a user standing behind the rear door.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The present invention is discussed in greater detail below with reference to the appended drawings, in which.

DETAILED DESCRIPTION OF THE PREFERRED EMBODIMENTS

Figure 1:
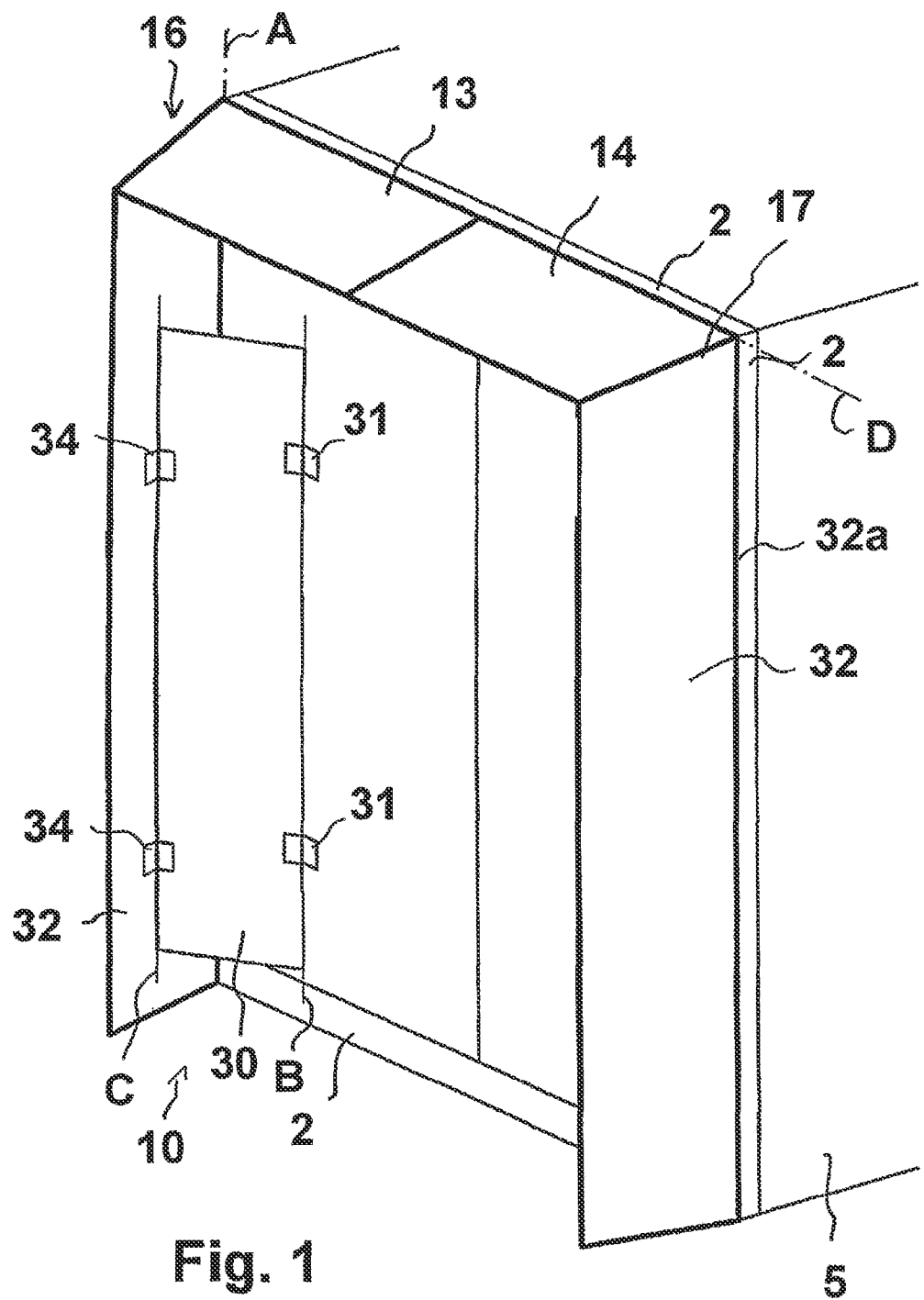
FIG. 1 is a rear perspective view of a utility vehicle with closed rear doors with a rear spoiler device according to an embodiment of the present invention in the travel position.

Referring to FIG. 1, a utility vehicle 1 has a vehicle structure 2, which is also referred to as a portal, in the rear region, and a storage space 3, which is delimited in an outward direction by side walls 4, 5 and in an upward direction by a vehicle roof 6. The side walls 4, 5 and the vehicle roof 6 may, for example, in a van, be constructed so as to be fixed or as load-bearing components, and accordingly be securely connected to the vehicle structure 2; furthermore, the construction of the side walls 4, 5 and optionally the vehicle roof 6 with tarpaulins is also known.

The storage space 3 can be closed at the rear by two rear doors 8, 9, which can be pivoted starting from their closed position shown in FIG. 1 about the hinge 7 thereof (or a plurality of hinges 7) through approximately 270° in an outward direction about the respective pivot axis A thereof and, for example, placed or also locked on the respective side wall 4, 5.

A rear spoiler device 10 is fitted to the utility vehicle 1. The rear spoiler device 10 has two roof spoilers 13, 14 and two side spoilers 16 and 17.

Figure 14:
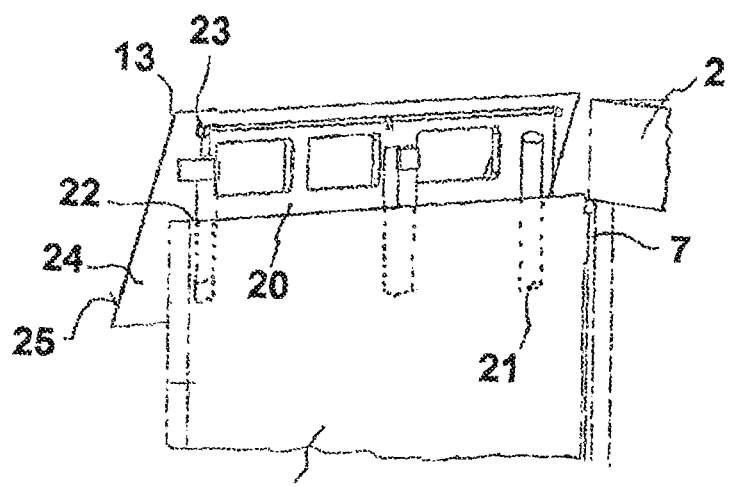
FIG. 14 is a perspective rear view of a rear door with a roof spoiler inserted from above.

The two roof spoilers 13, 14 are advantageously exclusively secured to the two rear doors 8, 9 by being inserted, for example, from above. According to FIG. 14, the left-hand (in the travel direction) roof spoiler 13 has a roof air direction element 24 and a securing device (bearing component) 20 that is secured to the rear door 8; to this end, the securing device 20 may be on, for example, three insertion rods 21, which extend vertically downward and which are inserted from above into the rear door 8. If the rear door 8 is already open at the upper side thereof, the insertion rods 21 can accordingly be inserted directly; with a closed door leaf, holes 22 can first be drilled in the upper edge 8a of the rear door and the insertion rods 21 are subsequently inserted therein from above.

Furthermore, the securing device 20 has a rotation axle 23, in order to enable a pivot movement about a pivot axis D for the roof air direction element 24. The roof air direction element 24 is produced as an integral plastics material component, for example, an injection-molded plastics material component with a planar or slightly bent outer face 25, whose shape is known. With the rear door 8 closed, the roof air direction element 24 substantially forms an extension of the vehicle roof 6, for example, with slight inclination in a downward direction.

The securing device 20 may, for example, be constructed from steel or from plastics material. The entire roof spoiler 13 is consequently constructed in the embodiment shown, for example, in two pieces with the securing device 20 and the roof air direction element 24, optionally with an additional rotation axle 23.

The two side spoilers 16, 17 each have a link 30 and a lateral air direction element 32. The link 30 is secured in a vertical pivot axis B, for example, by two first pivot joints 31, to the outer side 8b of the rear door 8, for which, for example, holes can be drilled in the rear door 8. The lateral air direction element 32 is in turn secured to the link 30 in a vertical pivot axis B via second pivot joints 34. The link 30 may be produced, for example, from metal, for example, aluminum or steel; the lateral air direction element 32 is in turn advantageously constructed from plastics material, for example, as an injection-molded component.

The lateral air direction elements 32 form an extension of the side walls 4, 5 as is conventional with side spoilers; to this end, the lateral air direction elements 32 may have a planar or suitably curved shape. The front edge 32a of the lateral air direction elements 32 terminates flush with the side wall 4 or 5 in order to produce a low air resistance. The pivot joints 31, 34, as shown in the drawing figures, are advantageously constructed at the ends of the links 30. The second pivot joints 34 are, for example, provided in central regions of the lateral air direction elements 32; however, they may also be provided in the rear end regions of the lateral air direction elements 32.

Figure 4:
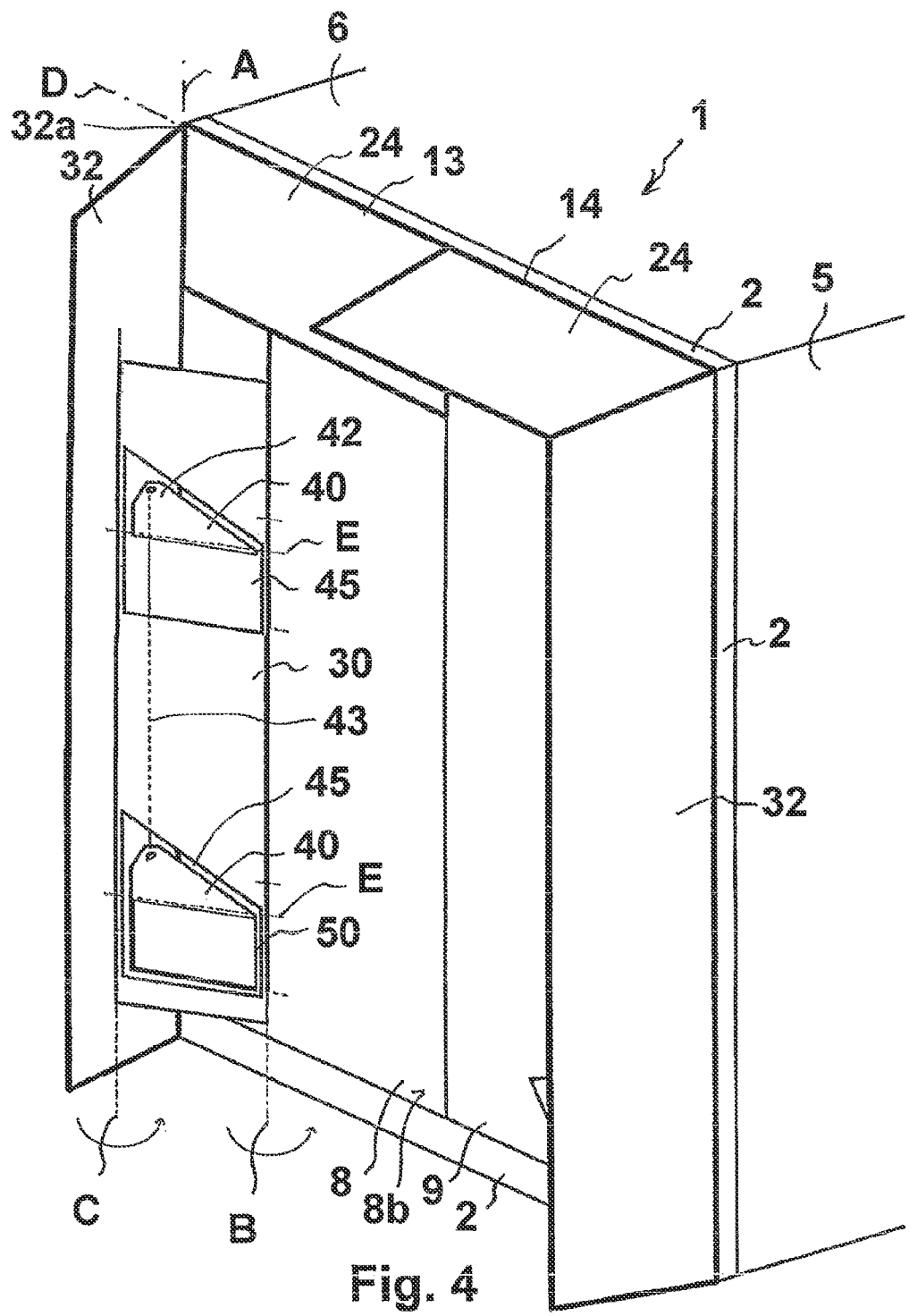
FIG. 4 illustrates the rear doors closed and side spoiler adjusted in the travel position prior to locking.

In order to lock the lateral air direction elements 32 in the travel position of FIG. 1, there are provided in each link 30 as locking devices two vertically spaced-apart flaps 40, which are each received in the link 30 so as to be able to be pivoted about a horizontal pivot axis E. In FIG. 4, the flaps 40 are in their vertical rest position, wherein they are received, for example, in recesses (free spaces) 45 of the link. The flaps 40 have at the upper end region thereof in the rest position first catch hooks 35 and second catch hooks 36, which are provided for locking or securing or engaging in catch receiving members 37 of the lateral air direction element 32 and catch receiving members 38 of the rear door 8.

An actuation lever 50 can be pivoted upward by a user from the vertically lower basic position thereof after unlocking through a total of about 180° and again be locked in this completely actuated position. The actuation lever 50 is advantageously supported together with a flap 40, in this instance the lower flap 40, in the pivot axis E. In the first part-pivot movement through about 90° it carries the lower flap 40, for example, by means of a coupling spring 56 so that the flap 40 is pivoted about the pivot axis E and the catch projection 35 thereof engages from above in the catch receiving member 37 at the inner side of the lateral air direction element 32 and, furthermore, the catch projection 36 thereof engages from above in the catch receiving member 38 of the rear door 8. Consequently, a catch connection 39 is produced that locks the components 32, 8 and 30 to each other. The catch connection 39 or securing by elements 35, 36, 37 and 38 is advantageously self-centering.

The two flaps 40 are coupled by a securing/coupling device 42 in their position or pivoting movement and thereby always extend parallel; to this end, the securing/coupling device 42 is constructed as a parallel guiding rod assembly, for example, having a securing/coupling rod 43, which is articulated to the upper ends of the two flaps 40.

The link 30 and the lateral air direction element 32 consequently together form with the respective rear door 8 or 9 of the vehicle 1 sides of a stable triangle whose corners are formed by the two pivot joints 31, 34 and catch connections 39.

Figure 2:
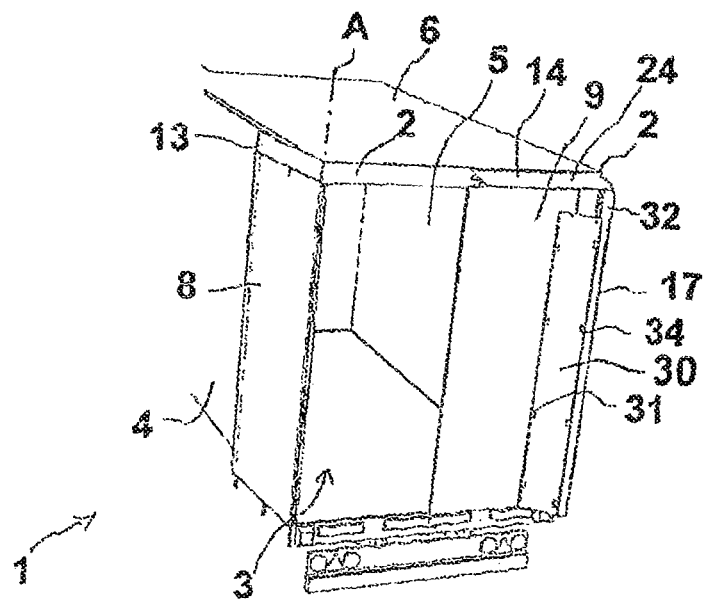
FIG. 2 is another perspective view with a rear door that has been opened and completely pivoted forward.
Figure 3:
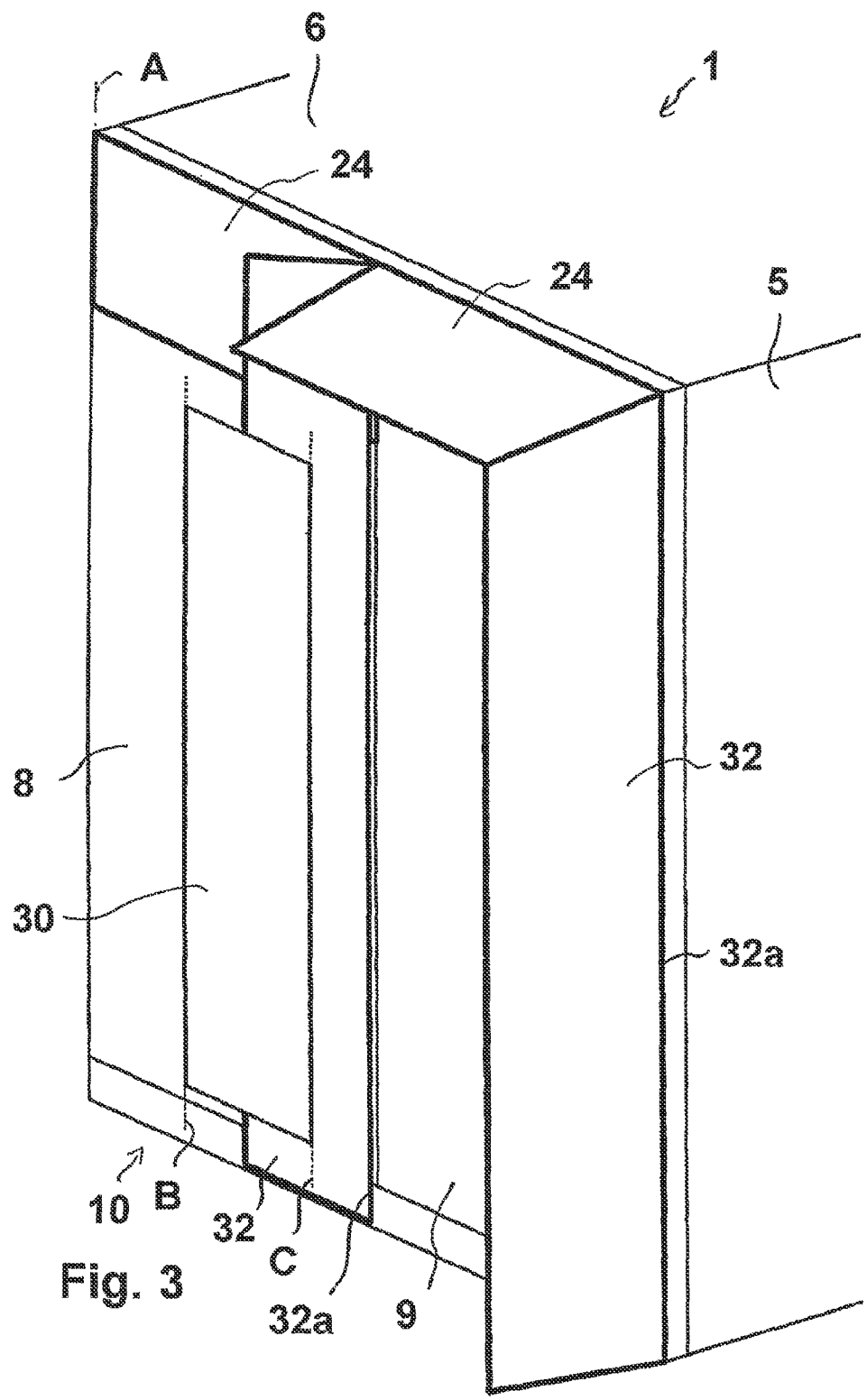
FIG. 3 is a view corresponding to FIG. 1 with the rear spoiler device adjusted into the basic, initial position and with the rear door closed.

In the basic position of FIG. 3, left-hand side, the roof air direction element 32 is positioned flat on the rear door 8. The lateral air direction element 32 is positioned flat on the rear door 8 and the roof air direction element 32; the link 30 is consequently positioned on the lateral air direction element 32 and the rear door 8. The rear door can consequently be pivoted forward through about 270° into the position of FIG. 2.

Based on FIG. 3, there is an adjustment in the travel direction by the lateral air direction element 32 being pivoted to the rear and consequently pivoting about the axis C thereof, wherein the link 30 is also further pivoted about the axis B on the rear door 8 until the front edge 32a is located substantially in continuation of the left-hand side wall 4, as shown in FIG. 4. This adjustment can be carried out in a simple manner by a person standing behind the rear door 8.

Figure 7:
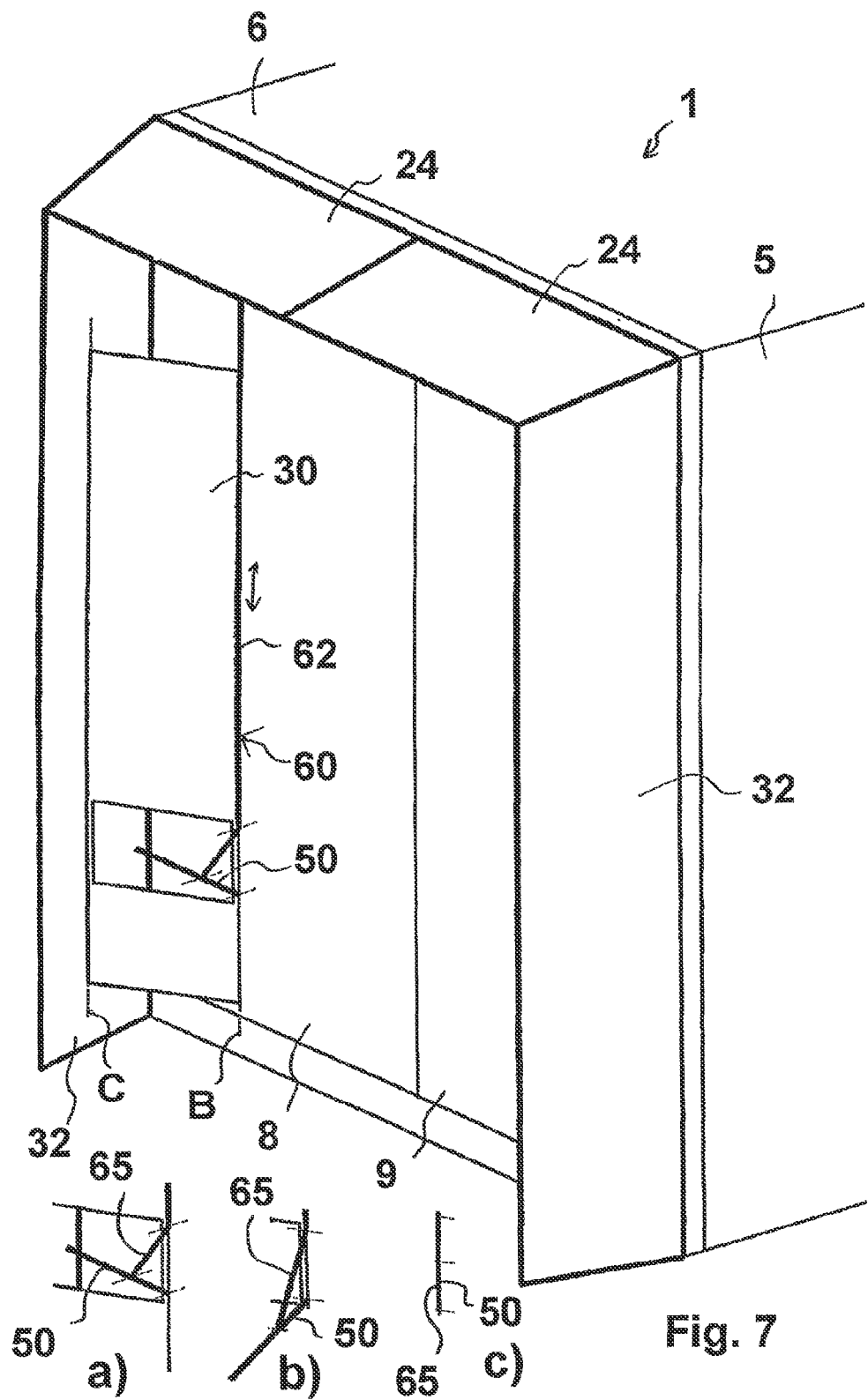
FIG. 7 is an illustration that corresponds to FIG. 5 of the actuation of the actuation lever in three lever positions a), b), c), without illustration of the locking by the flap.

Subsequently, the user unlocks the actuation lever 50 and then pivots it in a single pivot movement through approximately 180° upward about the lower axis E. In FIG. 7, locking by the flap is not shown purely for reasons of clarity.

In a first part-pivot range through approximately 90°, which corresponds to the position of FIG. 7b), the actuation lever 50 pivots the lower flap 40 as a result of the coupling by a coupling spring 56 so that the lower flap 40 and, as a result of the securing/coupling rod 43, also the upper flap 40 engage with the catch hooks 35, 36 thereof in the catch receiving members 37, 38 and consequently lock with respect to the lateral air direction element 32 and the rear door 8. In the following second part-pivot range through a further 90°, this arrangement no longer changes; to this end, the coupling spring is constructed in a flexible manner. After the entire pivot movement through about 180°, the actuation lever 50 is locked in the upper position thereof according to FIG. 7c).

Figure 8:
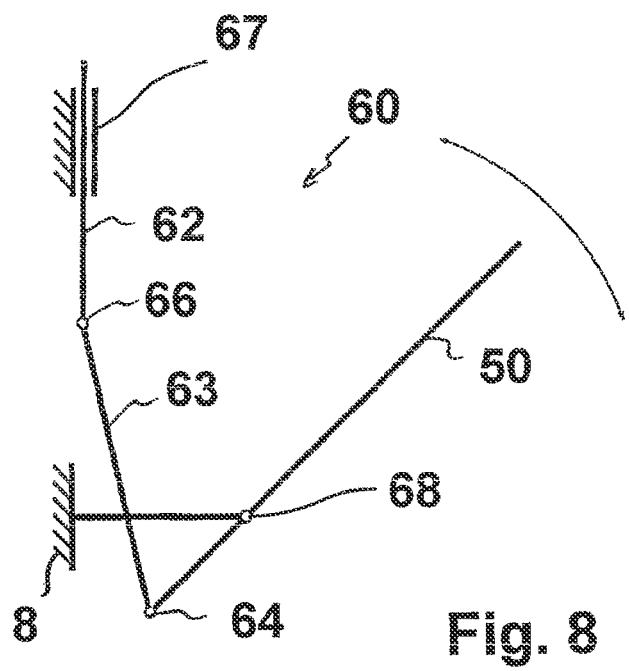
FIG. 8 is a schematic illustration of the coupling between the flap and push rod according to an embodiment of the present invention with a dual articulation.
Figure 9:
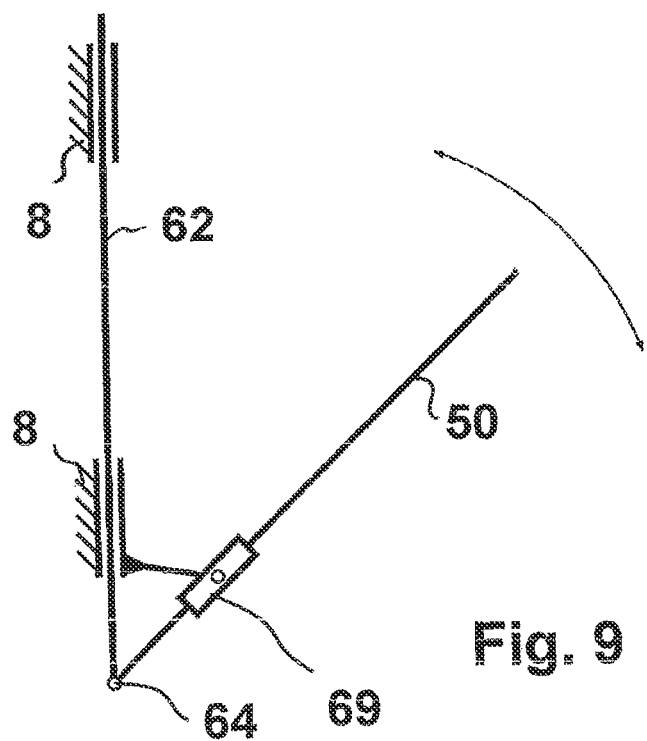
FIG. 9 shows an alternative embodiment to FIG. 8 with coupling by a rail.
Figure 10:
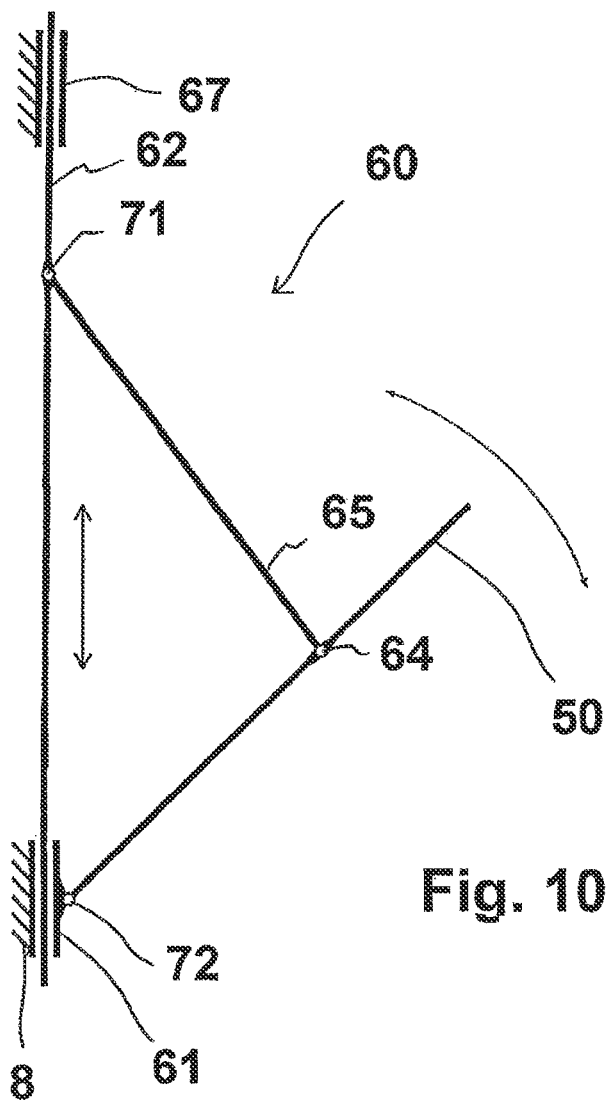
FIG. 10 shows an alternative embodiment to FIGS. 8 and 9 with coupling by a skylight type lever.

Furthermore, in the entire pivot movement of the actuation lever 50 through about 180° via a coupling device 60, the roof air direction element 24 is lifted from the folded-in basic position in abutment with the rear door 8, for example, through an angle between 0° and less than 90°. The coupling device 60 has to this end a coupling push rod 62, which is articulated at the lower end thereof directly or indirectly to the actuation lever 50 and at the rear door 8—for example, substantially in the pivot axis B—extends vertically upward. FIGS. 8 to 10 show various embodiments in this regard.

The embodiment of FIG. 10 is also illustrated in a simplified manner in FIGS. 7*a*) to *c*) and shows an actuation by means of a skylight type lever. The actuation lever 50 is articulated in an articulation 72 of a pivot bearing 61 of the rear door 8 or also the link 30, that is, in the region of the axis B. There is articulated to the actuation lever 50 in an articulation 64 an intermediate member 65, which is articulated at the other end thereof in another articulation 71 to the push rod 62, which is guided in sliding bearings 67 in the region of the axis B, that is, on the rear door 8 and/or on the link 30. When the actuation lever 50 is pivoted upward, the push rod 62 is consequently pushed upward.

In the embodiment of FIG. 8, the actuation lever 50 is pivoted downward in order to adjust the push rod in an upward direction in the sliding bearing 67 thereof. The actuation lever 50 is supported in a central region in a bearing articulation 68 on the rear door 8 or the link 30, arranged in the region of the pivot axis B and consequently on the articulated connection of the link 30 on the rear door 8. A lower lever articulation 64 consequently pivots in the opposite direction to the actuation lever 51, that is, upward when the actuation lever 50 is pivoted downward, and pushes the push rod 62 upward via an intermediate member 63 and an articulation 66.

Also in the embodiment of FIG. 9, the actuation lever 50 is pivoted downward in order to move the push rod upward in the sliding bearing 67 thereof. There is received in the actuation lever 50 a sliding bearing 69, which is supported in an articulated manner on the rear door 8 or the link 30, in particular in the region of the pivot axis B. Consequently, the lower lever articulation 64 can directly displace the push rod 62 since the sliding bearing 69 is adjusted accordingly in the position thereof.

Figure 11:
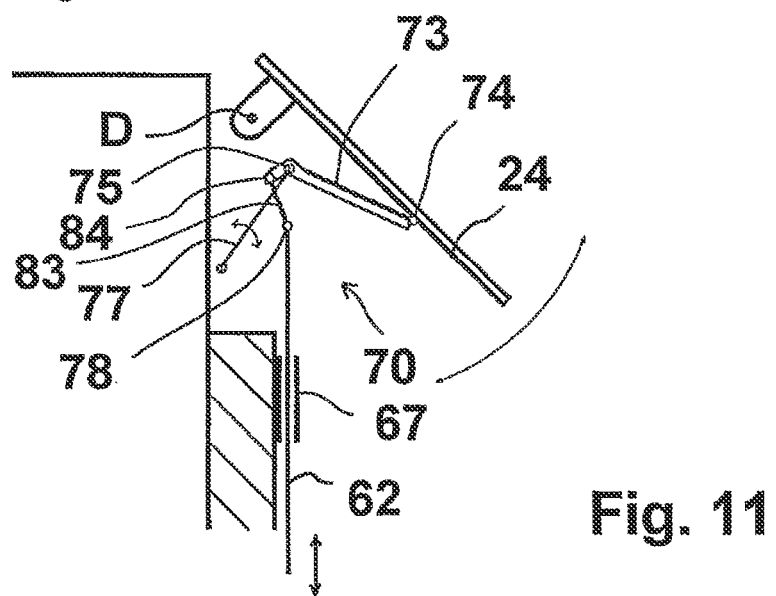
FIG. 11 shows an alternative embodiment to FIGS. 8 to 10 with coupling by a scissor type mechanism.
Figure 12:
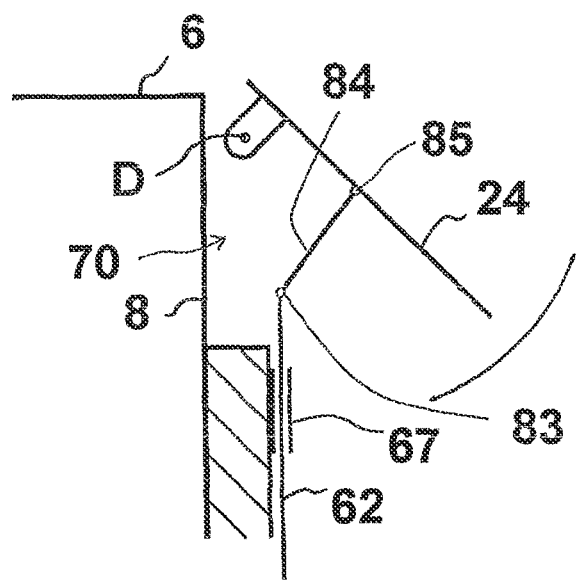
FIG. 12 shows an alternative embodiment to FIGS. 8 to 11 with coupling by a short rod coupling.
Figure 13:
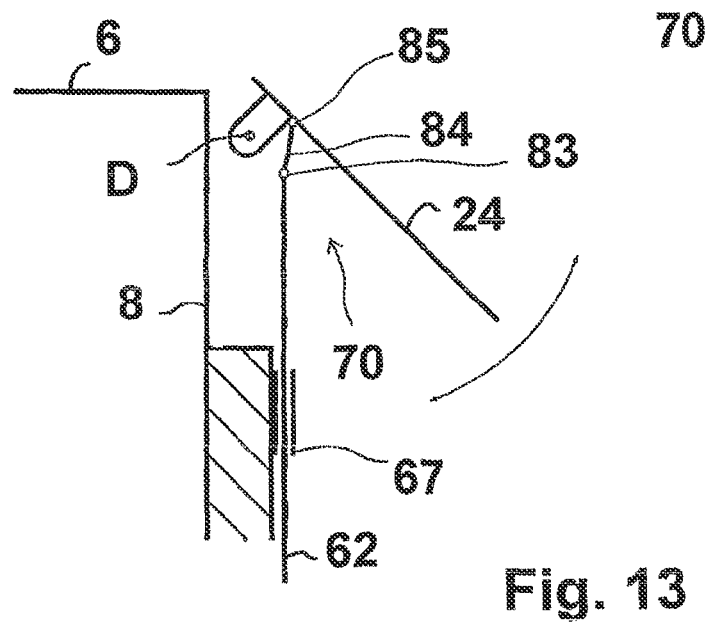
FIG. 13 shows an alternative embodiment to FIGS. 8 to 12 with coupling by a long rod coupling.

At the upper end thereof, the coupling push rod 62 pivots the roof air direction element 24 upward via an adjustment connection 70. FIGS. 11 to 13 show different embodiments of the adjustment connection 70. The embodiments of FIG. 12 are particularly advantageous with a short rod coupling and FIG. 13 with a long rod coupling since in this instance an adjustment of the roof air direction element 24 in the travel position is possible via a pushing movement of the push rod 62. In both cases, the push rod 62 is articulated at the upper end thereof via an articulation 83 and an intermediate member 84 in an articulation 85 to the roof air direction element 24, in these embodiments with a different lever length of the roof air direction element 24 about the pivot axis D thereof.

In the alternative embodiment according to FIG. 11 having a scissor type mechanism, the upper end of the push rod 62 is articulated in an articulation 83 to an intermediate member 84, which is articulated in an articulation 76 to an end of a folding rod 73, which can be pivoted about an axis 75, which in turn can be pivoted via a lever 77 on the rear door 8 or the link 30. The other end of the folding rod 73 is articulated in an articulation 74 to the roof air direction element 24. Consequently, when the push rod 62 is pulled, for example, via the lever connection according to FIG. 8 or 9, the roof air direction element 24 is pivoted upward.

Figure 5:
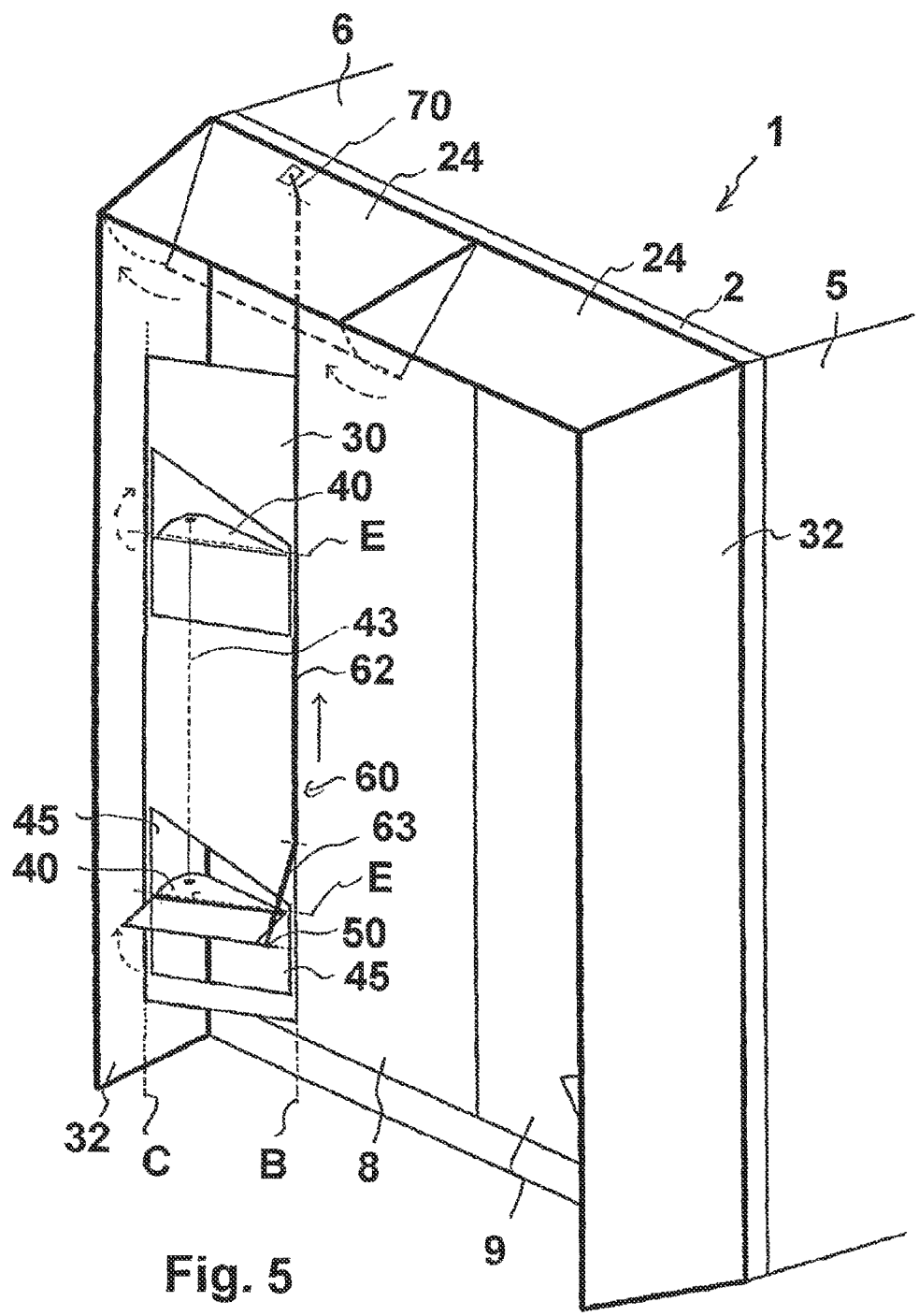
FIG. 5 is an illustration following FIG. 4 of the combined actuation of the locking of the side spoiler and adjustment of the roof spoiler.
Figure 6:
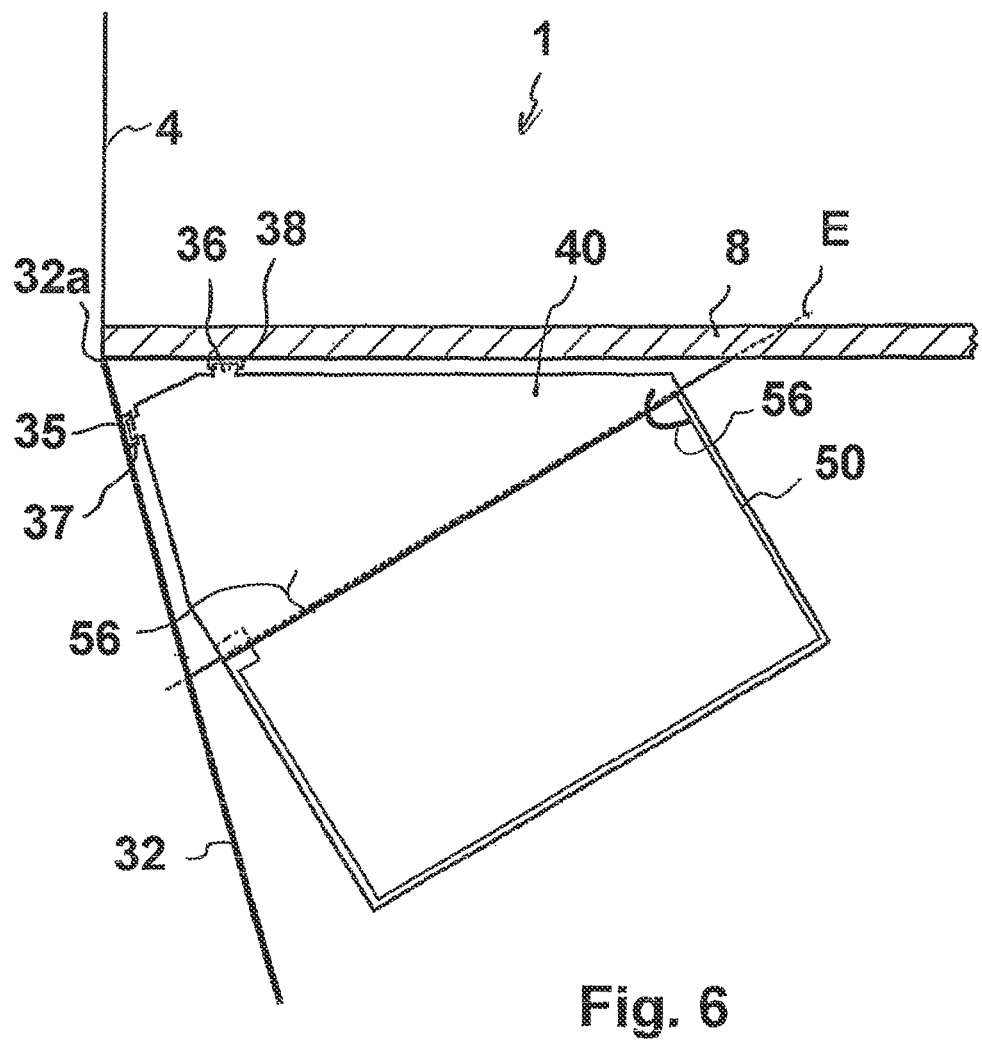
FIG. 6 is a vertical section from FIG. 4 with a plan view of a flap.

In order to move from the travel position of FIGS. 1 and 5 to the basic position of FIG. 3, left-hand side, the actuation lever 50 is first unlocked in the upper position thereof and subsequently pivoted through about 180° in a downward direction. In the entire pivot range, the roof air direction element 24 is pivoted downward via the adjustment connection 70. In the second, upper part-pivot range from about 180° to 90°, the flaps 40 are not adjusted. Subsequently, in the lower, first part-pivot range from about 90° to 0°, the lower flap 40 is carried by a carrier of the actuation lever 50 and pivoted upward, wherein the upper flap 40 is also pivoted via the securing/coupling rod 43 until both flaps 40 are again received in their vertical basic position in the recesses 45 of the link 30.

Subsequently, the entire rear spoilers 16, 17 are each folded in toward the center, for example, by a user gripping the respective lateral air direction element 32 and pivoting it inward in a large pivot movement such that the lateral air direction element 32 pivots about the second pivot joints 34 on the link 30 and the link 30 pivots in the first pivot joints 31 on the rear door 8 or 9, that is, both pivot axes B and C. During this adjustment in the basic position, the link 30 is folded down, for example, by approximately 100° and the lateral air direction element 32 is additionally pivoted with respect to the link 32 through, for example, approximately 100° again.

The rear doors 8, 9 are then completely displaced outward about the pivot axes A thereof, with a total pivot angle of approximately 270°. The rear spoiler device 10 with roof spoilers 13, 14 and side spoilers 16, 17 is consequently received between the rear door 8 or 9 and the side wall 3 or 4.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A rear spoiler device for a vehicle equipped with at least one rear door, the rear spoiler device comprising:
    a lateral air direction element and a roof air direction element adjustable between a basic position and a travel position for contour extension and aerodynamic air direction with the at least one rear door closed;
    a link, the link having at least one first pivot joint for pivotably securing the link to the at least one rear door, the link being fitted for adjustment to the lateral air direction element via at least one second pivot joint;
    at least one locking device for locking the lateral air direction element to the link; and
    a coupling device for coupling an adjustment of the at least one locking device with an adjustment of the roof air direction element,
    wherein the at least one locking device is fitted to the link so as to be pivotable to lock with a front end region of the lateral air direction element, and wherein the at least one locking device includes at least two vertically spaced apart locking devices pivotably fitted to the link and coupled in a locking movement by a securing/coupling device.

2. The rear spoiler device as claimed in claim 1, wherein the at least one locking device is configured to lock the link to both the lateral air direction element and one of the at least one rear door and vehicle structure.

3. A rear spoiler device for a vehicle equipped with at least one rear door, the rear spoiler device comprising:
  a lateral air direction element and a roof air direction element adjustable between a basic position and a travel position for contour extension and aerodynamic air direction with the at least one rear door closed;
  a link, the link having at least one first pivot joint for pivotably securing the link to the at least one rear door, the link being fitted for adjustment to the lateral air direction element via at least one second pivot joint;
  at least one locking device for locking the lateral air direction element to the link; and
  a coupling device for coupling an adjustment of the at least one locking device with an adjustment of the roof air direction element,
  wherein the at least one locking device has a pivotable flap including catch hooks for engagement in catch receiving members of the lateral air direction element and/or catch receiving members of the at least one rear door or vehicle structure.

4. An aerodynamics system for a vehicle equipped with at least one rear door, the system comprising the rear spoiler device as claimed in claim 1, wherein the rear spoiler device is secured exclusively to the at least one rear door both in the basic position and in the travel position.

5. A rear spoiler device for a vehicle equipped with at least one rear door, the rear spoiler device comprising:
  a lateral air direction element and a roof air direction element adjustable between a basic position and a travel position for contour extension and aerodynamic air direction with the at least one rear door closed;
  a link, the link having at least one first pivot joint for pivotably securing the link to the at least one rear door, the link being fitted for adjustment to the lateral air direction element via at least one second pivot joint;
  at least one locking device for locking the lateral air direction element to the link;
  a coupling device for coupling an adjustment of the at least one locking device with an adjustment of the roof air direction element; and
  an actuation lever configured to enable (i) adjustment of the at least one locking device into locked position in a pivot movement and (ii) folding of the roof air direction element upward into the travel position via the coupling device.

6. The rear spoiler device as claimed in claim 5, wherein the pivot movement has a first and a second part-pivot range, and wherein the at least one locking device is adjustable in locked position in the first part-pivot range and the roof air direction element is adjustable in both the first part-pivot range and the second part-pivot range.

7. The rear spoiler device as claimed in claim 6, wherein the actuation lever is configured to (i) be pivotably received with the at least one locking device in a common pivot axis in or on the link and (ii) carry the at least one locking device by a carrier system in the first part-pivot range and release the at least one locking device in the second part-pivot range.

8. The rear spoiler device as claimed in claim 5, wherein the actuation lever and the coupling device are configured to activate a transmission device configured to activate an adjustment connection to adjust the roof air direction element.

9. The rear spoiler device as claimed in claim 1, wherein the at least one first pivot joint is disposed at a front end of the link and the at least one second pivot joint is disposed at a rear end of the link.

10. The rear spoiler device as claimed in claim 1, wherein, in the travel position,
  the link, the lateral air direction element and the at least one rear door form sides of a triangle.

11. The rear spoiler device as claimed in claim 10, wherein the at least one first pivot joint and the at least one second pivot joint form corners of the triangle.

12. The rear spoiler device as claimed in claim 1, wherein the roof air direction element is pivotably articulated to a securing device fitted to the at least one rear door without being secured to vehicle structure.

13. A rear spoiler device for a vehicle equipped with at least one rear door, the rear spoiler device comprising:
  a lateral air direction element and a roof air direction element adjustable between a basic position and a travel position for contour extension and aerodynamic air direction with the at least one rear door closed;
  a link, the link having at least one first pivot joint for pivotably securing the link to the at least one rear door, the link being fitted for adjustment to the lateral air direction element via at least one second pivot joint;
  at least one locking device for locking the lateral air direction element to the link; and
  a coupling device for coupling an adjustment of the at least one locking device with an adjustment of the roof air direction element, wherein, when unlocked from the at least one locking device, the lateral air direction element is pivotable about the at least one second pivot joint and the link is pivotable about the at least one first pivot joint.

14. The rear spoiler device as claimed in claim 13, wherein, in the basic position, the roof air direction element is positionable flat on the at least one rear door, the lateral air direction element is positionable flat on the at least one rear door and the roof air direction element, the link is positionable flat on the lateral air direction element and the at least one rear door, and the at least one rear door is foldable outward from closed position through approximately 270° and is positionable on a side wall of the vehicle.

15. The rear spoiler device as claimed in claim 8, wherein the transmission device is a push rod.

16. The rear spoiler device as claimed in claim 12, wherein the securing device is fitted to an upper edge of the at least one rear door.

17. The rear spoiler device as claimed in claim 16, wherein the securing device is fitted to openings at the upper edge of the at least one rear door.

18. A rear spoiler device for a vehicle equipped with at least one rear door, the rear spoiler device comprising:
  a lateral air direction element and a roof air direction element adjustable between a basic position and a travel position for contour extension and aerodynamic air direction with the at least one rear door closed;
  a link, the link having at least one first pivot joint for pivotably securing the link to the at least one rear door, the link being fitted for adjustment to the lateral air direction element via at least one second pivot joint;
  at least one locking device for locking the lateral air direction element to the link; and a coupling device for coupling an adjustment of the at least one locking device with an adjustment of the roof air direction element, wherein the at least one locking device is fitted to the link so as to be pivotable to lock with a front end region of the lateral air direction element, and wherein the at least one locking device is fitted to the link so as to be pivotable to lock with one of the at least one rear door and the vehicle structure.

\* \* \* \* \*